(12) United States Patent
Anderson et al.

(10) Patent No.: US 7,152,567 B2
(45) Date of Patent: Dec. 26, 2006

(54) PISTON FOR AN INTERNAL COMBUSTION ENGINE

(75) Inventors: Werner Anderson, Oberboihingen (DE); Thomas Hoch, Stuttgart (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 10/536,537

(22) PCT Filed: Nov. 27, 2003

(86) PCT No.: PCT/DE03/03928

§ 371 (c)(1),
(2), (4) Date: May 26, 2005

(87) PCT Pub. No.: WO2004/051118

PCT Pub. Date: Jun. 17, 2004

(65) Prior Publication Data

US 2006/0021500 A1    Feb. 2, 2006

(30) Foreign Application Priority Data

Nov. 29, 2002  (DE) ............................... 102 55 731

(51) Int. Cl.
*F02F 3/00* (2006.01)
(52) U.S. Cl. .................................. 123/193.6
(58) Field of Classification Search ............. 123/193.6; 92/187; 29/888.042
See application file for complete search history.

(56) References Cited

U.S. PATENT DOCUMENTS

| | | | |
|---|---|---|---|
| 1,923,597 A * | 8/1933 | Walker .................. | 184/11.1 |
| 3,023,060 A | 2/1962 | Pachernegg | |
| 4,297,975 A | 11/1981 | Galli | |
| 4,550,647 A * | 11/1985 | Coulin ................... | 92/157 |
| 6,491,013 B1 * | 12/2002 | Gaiser et al. ............ | 123/193.6 |
| 6,513,477 B1 * | 2/2003 | Gaiser et al. ............ | 123/193.6 |
| 6,923,153 B1 * | 8/2005 | Rein et al. .............. | 123/193.6 |
| 2002/0061146 A1 | 5/2002 | Ono et al. | |

FOREIGN PATENT DOCUMENTS

| | | |
|---|---|---|
| AT | 198069 | 6/1958 |
| CH | 476204 | 9/1969 |
| DE | 512364 | 10/1930 |
| DE | 1725611 | 7/1956 |
| DE | 1979948 | 2/1968 |
| DE | 2333031 | 1/1975 |
| DE | 3518721 | 11/1986 |
| DE | 3740820 | 1/1989 |
| DE | 3830 033 | 6/1989 |
| EP | 0095951 | 3/1986 |
| FR | 1239739 | 8/1960 |
| GB | 521632 | 5/1940 |

\* cited by examiner

*Primary Examiner*—Marguerite McMahon
(74) *Attorney, Agent, or Firm*—Collard & Roe, P.C.

(57) ABSTRACT

The invention relates to a piston for an internal combustion engine comprising piston-pin bores, into which lubrication grooves that run around the nadir and equator zones of said bores are machined. The aim of the invention, is to simplify the production of the piston-pin bores provided with said lubrication grooves. To achieve this, each of the lubrication grooves has a central region, whose groove base has a depth of less than 100 μm. Said central region is flanked by groove areas facing towards the interior and exterior of the piston. The bases of said grooves are inclined towards the longitudinal axis, each forming an acute angle with the longitudinal axis of the piston-pin bore.

3 Claims, 1 Drawing Sheet

PISTON FOR AN INTERNAL COMBUSTION ENGINE

CROSS REFERENCE TO RELATED APPLICATIONS

Applicants claim priority under 35 U.S.C. §119 of German Application No. 102 55 731.4 filed Nov. 29, 2002. Applicant also claims priority under 35 U.S.C. §365 of PCT/DE2003/003928 filed Nov. 27, 2003. The international application under PCT article 21(2) was not published in English.

The invention relates to a piston for an internal combustion engine, in accordance with the preamble of claim 1.

It is known, from the Offenlegungsschrift DE 38 30 033 A1, to machine a lubrication groove into the pin bore of a piston for an internal combustion engine, which groove runs over the nadir and the equator region of said bore, thereby causing an oil reservoir that serves for lubrication of the piston pin that is introduced into the pin bore. Usually, in this connection, at first the pin bore is lathed into the pin boss by means of a preliminary lathe tool, after which the inside surface of the pin bore is precision-machined, within the scope of a second method step. The actual lubrication groove is milled into the finished pin bore only in a third method step.

Proceeding from this, the invention is based on the task of structuring the pin bore of a piston for an internal combustion engine, which has been provided with a lubrication groove, in such a manner that its production can be simplified and made less expensive.

The solution for this task is indicated in the characterizing part of the main claim.

Practical embodiments of the invention are the subject of the dependent claims.

The configuration of the lubrication groove of a pin bore, according to the invention, has the advantage, in this connection, that after the pin bore is lathed, only a single further method step is required for precision-machining of the pin bore and for producing the lubrication groove, since parallel to the precision-machining of the pin bore, only relative movements between the piston and the lathe tool, corresponding to the shape of the lubrication groove, are required, in order to lathe the lubrication groove, which is configured as a flat groove, into the inside surface of the pin bore.

Figure 1:
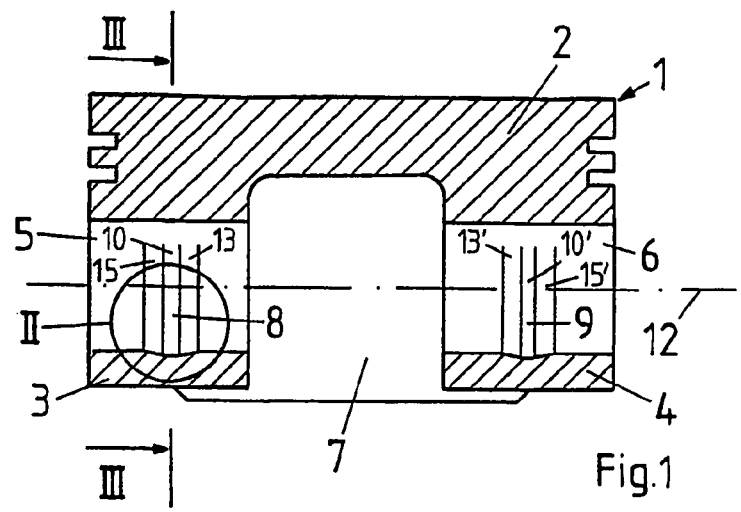
Figure 2:
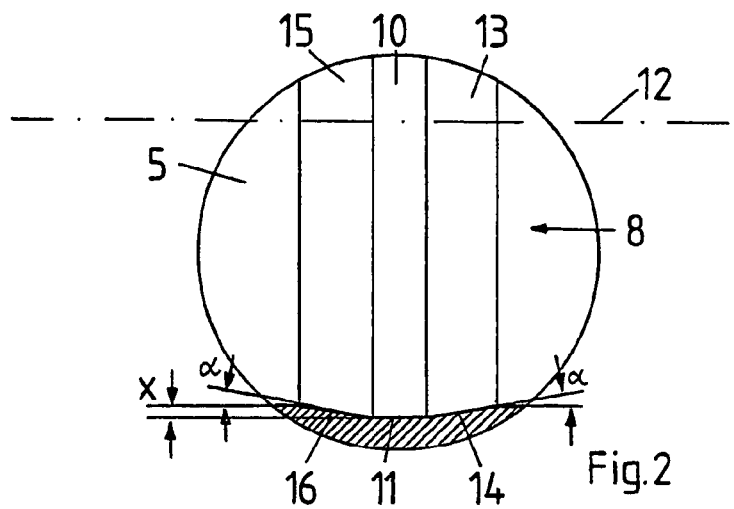
Figure 3:
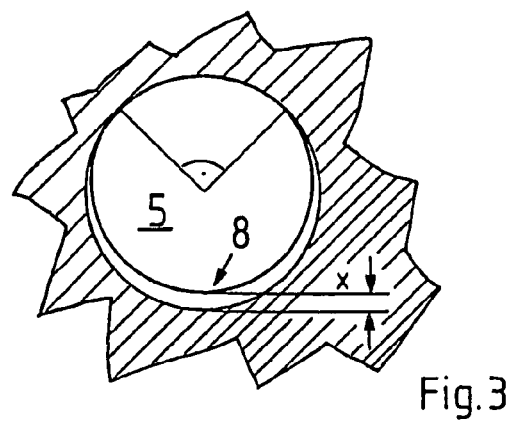

An exemplary embodiment of the invention is explained below, using the drawings. These show:

FIG. 1 a piston in section, with pin bores that each have a lubrication groove according to the invention, FIG. 2 an enlargement of the detail II from FIG. 1, with a sectional representation of the lubrication groove, and FIG. 3 a partial section through the piston along the line III—III in FIG. 1, with a side view of the lubrication groove.

FIG. 1 shows a piston 1 for an internal combustion engine, in section, with a piston head 2 onto which two pin bosses 3 and 4, each having a pin bore 5 and 6, are formed. In the section direction chosen in FIG. 1, one of the two skirts 7 of the piston 1 is shown in a top view.

A lubrication groove 8, 9, is worked into the center region of the pin bores 5, 6, in each instance, which, as shown in FIG. 2, an enlarged detail II of FIG. 1, has a center region 10 whose groove root 11 lies parallel to the longitudinal axis 12 of the pin bores 5. Towards the inside of the piston, the region 10 is followed by a groove region 13, the groove root 14 of which is inclined at a slant towards the inside of the piston and in the direction of the longitudinal axis 12, and encloses an acute angle α of less than 10°, preferably less than 3°, with a longitudinal direction of the pin bore 5. Towards the outside of the piston, the center region 10 is followed by a groove region 15, the groove root 16 of which is inclined at a slant towards the outside of the piston and also in the direction of the longitudinal axis 12, and encloses the same angle α of less than 10°, preferably less than 3°, with the longitudinal direction of the pin bore 5. The lubrication groove 9 in the pin bore 6 has the same shape as the lubrication groove 8. The depth x of the center regions 10 of the two lubrication grooves 8 and 9 has a value of approximately 40 to 60 μm.

In FIG. 1 it is indicated, and in FIG. 3, a side view of the lubrication groove 8 that is not to scale, a partial section along the line III—III in FIG. 1, it is clearly evident that the lubrication groove 8 (just like the lubrication groove 9) is machined into the nadir region and the equator region of the pin bore 5, and covers a region of approximately 270°. In this connection, a region of approximately 90° therefore remains free of grooves at the zenith, resulting in the advantage that the surface pressure of the zenith region, which results under the effect of the force of the work cycle when the piston pin is introduced, is not impaired by a lubrication groove.

The lubrication grooves 8 and 9 each form an oil reservoir that assures the oil supply for lubrication of a piston pin introduced into the pin bore 5, 6, not shown in the figures, both during start-up of an engine equipped with the piston 1, and during continuous operation of the engine. This oil reservoir is filled by means of the pump effect of the piston pin that deforms during engine operation, so that a separate oil feed is not necessary for this purpose.

The lubrication grooves 8 and 9 are produced in the same manner as conventional shaped bores machined into the ends of pin bores. In this connection, the actual pin bores 5, 6 are first lathed into the pin bosses 3, 4 by means of a preliminary lathe tool. Subsequently, the inside surfaces of the pin bores 5, 6 are precision-machined by means of a lathe tool having a blade that projects laterally and, at the same time, the lubrication grooves 8, 9, which are configured as flat grooves, are lathed into the inside surfaces of the pin bores 5, 6.

Since the lubrication grooves 8, 9 cover only approximately 270° of the nadir and equator regions of the inside surfaces of the pin bores 5, 6 and have the sickle shape shown in FIG. 3, in section, during the production of the lubrication grooves 8, 9 the lathe tool, which is put into rotation, must be deflected so far, in the region of the lubrication grooves 8, 9, during each individual rotation, that the required depth of the lubrication grooves 8, 9, at 40 to 60 μm, is achieved.

Alternatively to this, when the lathe tool is put into rotation, the piston 1 can always be deflected a little bit whenever the blade of the lathe tool is located in that region of the inside surface of the pin bore 5, 6 into which the lubrication groove 8, 9 is to be lathed.

It is advantageous, in this connection, that after the pin bores have been lathed, only a single further method step is required for producing the lubrication grooves 8, 9 according to the invention, since parallel to the precision machining of the inside bore surfaces, only relative movements between the piston and the lathe tool, corresponding to the shape of the lubrication grooves 8, 9, are necessary to produce the lubrication grooves 8, 9.

REFERENCE SYMBOLS 1 piston
2 piston head
3 pin boss
4 pin boss
5 pin bore
6 pin bore
7 skirt
8 lubrication groove
9 lubrication groove
10, 10' center region
11 groove root of the center region 10
12 longitudinal axis
13, 13' groove region
14 groove root of the region 13
15, 15' groove region
16 groove root of the region 15

The invention claimed is:

1. A piston for an internal combustion engine, comprising:
a piston head;
two pin bosses formed onto the piston head;
at least one semi-circular lubricating groove machined into center regions of inside surfaces of the pin bores when viewed in a direction of a longitudinal axis of the pin bores, said at least one groove being circumferential at least over a nadir region and an equator region of the pin bores, said at least one groove having a center region with a flat cross section and a transverse width that lies parallel to the longitudinal axis of the pin bore and has a depth of less than 100 μm as compared with the inside surface of the pin bore,
wherein toward an inside of the piston, the center region of the at least one lubrication groove is followed by a groove region which is inclined at a slant towards the inside of the piston and in the direction of the longitudinal axis, and encloses an acute angle of less than 3° with the longitudinal direction of the pin bore, and
wherein towards an outside of the piston, the center region of the at least one lubrication groove is followed by a groove region that is inclined at a slant towards the outside of the piston and also in the direction of the longitudinal axis, and encloses an acute angle of less than 3° with the longitudinal direction of the pin bore.

2. A piston according to claim 1, wherein the depth of the groove in the center region of the at least one lubrication groove is 40 to 60 μm relative to the inside surface of the pin bore.

3. A piston according to claim 1, wherein more than one lubrication groove is machined into each of the pin bores.

* * * * *